Oct. 3, 1961  D. B. SPALDING  3,002,357
PRESSURE EXCHANGERS
Original Filed Feb. 24, 1956
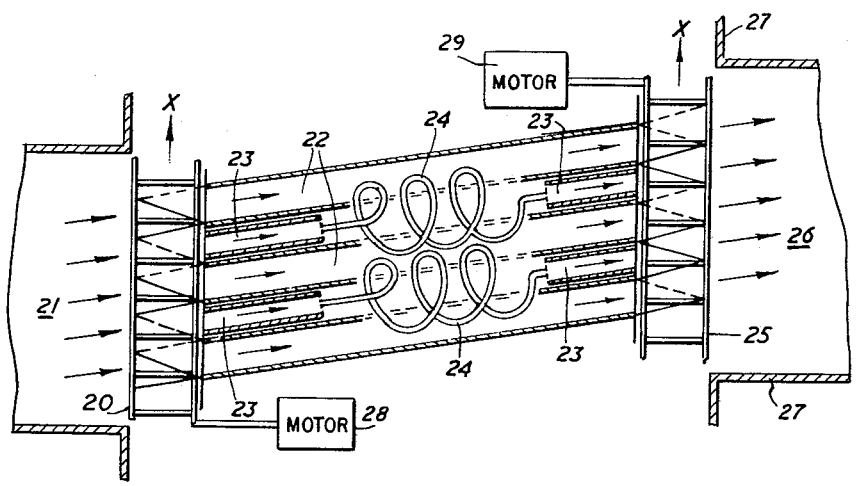
INVENTOR
BRIAN DUDLEY SPALDING
BY
ATTORNEY 3,002,357
PRESSURE EXCHANGERS
Dudley Brian Spalding, 2 Vineyard Hill Road,
London, England
Continuation of application Ser. No. 567,607, Feb. 24, 1956. This application Sept. 21, 1959, Ser. No. 841,255
Claims priority, application Great Britain Mar. 9, 1955
3 Claims. (Cl. 62—6)

The invention relates to pressure exchanger apparatus and to methods of using such apparatus to compress and to expand fluid.

As aircraft speeds increase beyond the Mach number 1, skin friction gives rise to a marked heating of the aircraft structure which may lead to structural damage and uncomfortable conditions for the pilot. Hence it is now essential to install a cooling plant and clearly it is desirable that the plant should be of simple construction.

The term "pressure exchanger" is used herein to mean apparatus comprising cells in which one gas quantity expands, so compressing another gas quantity with which it is in direct contact, ducting to lead gas substantially steadily to and from the cells at different pressures and means to effect relative motion between the cells and the ducting.

United States patent application Serial No. 567,607, applicant, Dudley Brian Spalding, filed February 24, 1956, and now abandoned of which the present application is a continuation, describes and claims pressure exchangers in which a stream of gas is introduced to the cells at medium pressure level, and this stream is divided to produce one stream at a higher pressure level and another stream at a lower pressure level. Such pressure exchangers are termed "pressure dividers" and their construction and mode of operation have been fully described in the afore-mentioned co-pending application.

The "pressure divider" may also be considered as a "temperature divider" provided the compression and expansion steps are such that fluid streams extracted at higher and lower pressures are hotter and colder respectively than the fluid stream introduced to cells of the pressure exchanger apparatus.

According to the present invention apparatus including a pressure exchanger comprises a first group of cells, a second group of cells, medium pressure introduction means arranged to introduce fluid at an initial pressure to cells of the first group, a high pressure duct interconnecting cells of the first group to cells of the second group and arranged to extract fluid from cells of the first group at a pressure higher than the initial pressure and to introduce the said higher pressure fluid to the cells of the second group, a low pressure duct interconnecting cells of the first group to cells of the second group and arranged to extract fluid from cells of the first group at a pressure lower than the initial pressure and to introduce the said lower pressure fluid to the cells of the second group, medium pressure extraction means arranged to extract fluid from cells of the second group at a pressure intermediate said higher and lower pressures, heat-exchanger means for which the said low pressure duct constitutes the cold path and means for effecting relative motion between each group of cells and the ducts.

The application of a temperature divider as a cooling or refrigerating plant is especially convenient for cooling aircraft. Although aircraft normally travel through cold air, they attain approximately the stagnation temperature $$T_0 = T + \frac{V}{2C_p}$$

where T is the air temperature, V is the aircraft velocity, and $C_p$ is the specific heat of the air at constant pressure.

At supersonic velocities, the stagnation temperature becomes uncomfortably large. Cooling of the aircraft is then difficult because heat-exchange surfaces in the aircraft act as though they are in contact with a medium at the temperature $T_0$, although the temperature of the surroundings is only T. Therefore in order to reduce any part of the aircraft to a temperature below $T_0$, it is necessary to carry out a heat pump operation. Pressure exchanger apparatus may conveniently be used for this purpose.

By way of example, one embodiment in accordance with the invention will now be described with reference to the accompanying diagrammatic drawing the single figure of which illustrates a combination of a pressure exchanger working as a pressure divider and a pressure exchanger working as a pressure equaliser.

The drawing shows a pressure exchanger apparatus especially suitable for aircraft cooling. The apparatus comprises a first cell ring 20 driven by a motor 28, and a second cell ring 25 driven by a motor 29. "Ram" air is introduced to the cell ring 20 through a medium pressure fluid introduction duct 21 communicating with one end of the cells around the whole periphery of the ring. At the other end of the cell ring 20, high pressure extraction ducts 22 and low pressure extraction ducts 23 are arranged to communicate alternately with the cells around the periphery of the ring. The cell ring 20 therefore constitutes a pressure or temperature divider. The low pressure ducts 23 are connected via cooling coils 24 constituting the cold path of a heat-exchanger to one end of the second cell ring 25. The high pressure ducts 22 are connected directly to the same end of the cell ring 25 and alternate with the duct ends 23 around the periphery. The other end of the cells of the cell ring 25 are open to atmosphere at 26 through a fluid extraction duct 27. The cell ring 25 receives streams of high pressure air through the ducts 22 and of low pressure air through ducts 23 and ejects air in a single stream at a pressure intermediate the input streams. The cell ring 25 is therefore the converse of a pressure divider, that is to say it acts as a pressure "equaliser." The cooling coils 24 may be positioned in practice in the structure of the aircraft or in the cabin walls.

The term "fluid" has been used herein to cover either gases or liquids, or a mixture of the two. In the latter case the arrangement of the cell ring or rings may be such that it is the gas which is exhausted at the high pressure and the liquid at the low pressure, or vice versa.

I claim:
1. Pressure exchanger apparatus comprising a first group of cells, a second group of cells, medium pressure introduction means arranged to introduce fluid at an initial pressure to cells of the first group, a high pressure duct interconnecting cells of the first group to cells of the second group and arranged to extract fluid from cells of the first group at a pressure higher than the initial pressure and to introduce the said higher pressure fluid to the cells of the second group, a low pressure duct interconnecting cells of the first group to cells of the second group and arranged to extract fluid from cells of the first group at a pressure lower than the initial pressure and to introduce the said lower pressure fluid to the cells of the second group, medium pressure extraction means arranged to extract fluid from cells of the second group at a pressure intermediate said higher and lower pressures, heat-exchanger means for which the said low pressure duct constitutes the cold path and means for effecting relative motion between each group of cells and the ducts.

2. Pressure exchanger apparatus comprising a first ring of cells, a second ring of cells, medium pressure fluid introduction means arranged to introduce fluid at an initial pressure to cells of the first cell ring, a high pressure duct interconnecting cells of the first cell ring to cells of the second cell ring and arranged to extract fluid from cells of the first cell ring at a pressure higher than the initial pressure and to introduce the said higher pressure fluid to the cells of the second cell ring, a low pressure fluid duct interconnecting cells of the first cell ring to cells of the second cell ring and arranged to extract fluid from cells of the first ring of cells at a pressure lower than the initial pressure and to introduce the said lower pressure fluid to cells of the second cell ring, medium pressure fluid extraction means arranged to extract fluid from cells of the cell ring at a pressure intermediate the higher and lower pressures, a heat-exchanger for which the low pressure duct constitutes the cold path and means to effect relative rotation between each cell ring and the ducts.

3. Pressure exchanger apparatus comprising means defining two series of open-ended cells each arranged in a ring for the compression and expansion of a fluid, means defining end walls for each cell ring and a series of circumferentially spaced ports in the end walls of each ring communicating with the cells thereof, means for causing relative rotation between each cell ring and the end walls thereof, the series of ports in the end walls of one cell ring including in respective succession in one direction of rotation, a port for introducing compressed fluid to the cells thereof, a port for extracting high pressure fluid from the cells thereof, and a port for extracting low pressure fluid from the cells thereof, and the series of ports in the end walls of the other cell ring including in respective succession in one direction of rotation, a port for admitting high pressure fluid to the cells thereof, a port for withdrawing medium pressure fluid from the cells thereof, and a port for admitting low pressure fluid to the cells thereof, duct means connecting said high pressure fluid extraction and high pressure fluid admission ports and connecting said low pressure fluid extraction and low pressure fluid admission ports, and heat exchange means associated with the duct means to extract heat from the low pressure fluid.

References Cited in the file of this patent

UNITED STATES PATENTS

| | | |
|---|---|---|
| 2,399,394 | Seippel | Apr. 30, 1946 |
| 2,526,618 | Darrieus | Oct. 24, 1950 |
| 2,697,593 | Rydberg | Dec. 21, 1954 |
| 2,762,557 | Jendrassik | Sept. 11, 1956 |
| 2,852,915 | Jendrassik | Sept. 23, 1958 |

FOREIGN PATENTS

| | | |
|---|---|---|
| 159,112 | Australia | Sept. 29, 1954 |